United States Patent [19]

Gelardi et al.

[11] Patent Number: 4,760,914

[45] Date of Patent: Aug. 2, 1988

[54] THEFT-RESISTANT RETAIL CONTAINER

[75] Inventors: Anthony Gelardi, Cape Porpoise, Me.; Alan Lowry, Canton, Mass.; Craig Lovecky, Old Orchard Beach, Me.

[73] Assignee: Shape Inc., Biddeford, Me.

[21] Appl. No.: 55,559

[22] Filed: May 29, 1987

[51] Int. Cl.4 .................... B65D 85/672; B65D 85/57
[52] U.S. Cl. .................................. 206/1.5; 206/309; 206/387; 206/807
[58] Field of Search ............... 206/307, 309, 312, 313, 206/444, 1.5, 387, 807, 497

[56] References Cited

U.S. PATENT DOCUMENTS

| 3,415,365 | 12/1968 | Faulkner . |
| 3,530,981 | 9/1970 | Weinecke, Jr. . |
| 3,595,383 | 7/1971 | Boylan . |
| 3,641,732 | 2/1972 | Fujio .................... 206/497 |
| 3,656,612 | 4/1972 | Sellors . |
| 3,776,374 | 12/1973 | Medendorp . |
| 3,828,922 | 8/1974 | Holkestad .................... 206/387 |
| 3,871,516 | 3/1975 | Holkestad et al. . |
| 3,933,240 | 1/1976 | Humble .................... 206/1.5 |
| 4,084,690 | 4/1978 | Pulse . |
| 4,084,691 | 4/1978 | Leedom . |
| 4,084,694 | 4/1978 | Lainez et al. . |
| 4,145,726 | 3/1979 | Conaty . |
| 4,244,468 | 1/1981 | Spring et al. . |
| 4,245,741 | 1/1981 | Holkestad .................... 206/387 |
| 4,285,429 | 8/1981 | Mactavish .................... 206/1.5 |
| 4,327,831 | 5/1982 | Inaba et al. . |
| 4,361,233 | 11/1982 | Holkestad .................... 206/387 |
| 4,365,708 | 12/1982 | Tyus . |
| 4,381,836 | 5/1983 | Rivkin et al. . |
| 4,493,417 | 1/1985 | Ackeret . |
| 4,502,596 | 3/1985 | Saetre et al. . |
| 4,549,658 | 10/1985 | Sfikas . |
| 4,558,782 | 12/1985 | Iverson et al. . |
| 4,567,983 | 2/1986 | Morris . |
| 4,572,369 | 2/1986 | Morris . |
| 4,589,549 | 5/1986 | Hehn .................... 206/1.5 |
| 4,620,630 | 11/1986 | Moss . |
| 4,623,062 | 11/1986 | Chase et al. . |
| 4,634,004 | 1/1987 | Mortensen . |
| 4,635,792 | 1/1987 | Yamada et al. . |
| 4,635,797 | 1/1987 | Bankier . |
| 4,640,413 | 2/1987 | Kaplan et al. . |
| 4,664,258 | 5/1987 | Eichner . |
| 4,718,547 | 1/1988 | Mactavish .................... 206/387 |

Primary Examiner—Jimmy G. Foster
Attorney, Agent, or Firm—Staas & Halsey

[57] ABSTRACT

A one-piece retail container removably secures a substantially rigid item, such as a compact disc jewel box, in a securing well. The retail container includes a vertically elongated frame forming sides, top and bottom of the retail container and a front plate, integrally formed with the frame, having front and rear surfaces. The vertically elongated frame forms side and bottom walls of a securing well into which a first aperture of the front plate opens. The front plate forms securing well ledges for restraining the substantially rigid item from passing through the front plate from the securing well. Securing well tabs are integrally formed with the frame at the side and bottom walls of the securing well for restraining the substantially rigid item from moving in a rearward direction, while a center rib is integrally formed on the rear surface, of the front plate at the top of the securing well. The frame, front plate and center rib are formed of a semirigid material which flexes in response to external pressure to permit the substantially rigid item to slide over the center rib and into and out of the securing well. When the external force is removed, the frame, front plate and center rib substantially return to their original positions. A display well may be formed at the top of the retail container with a second aperture of the front plate opening onto the display well, the display well removably securing a substantially planar flexible item, such as a recording album card.

23 Claims, 5 Drawing Sheets

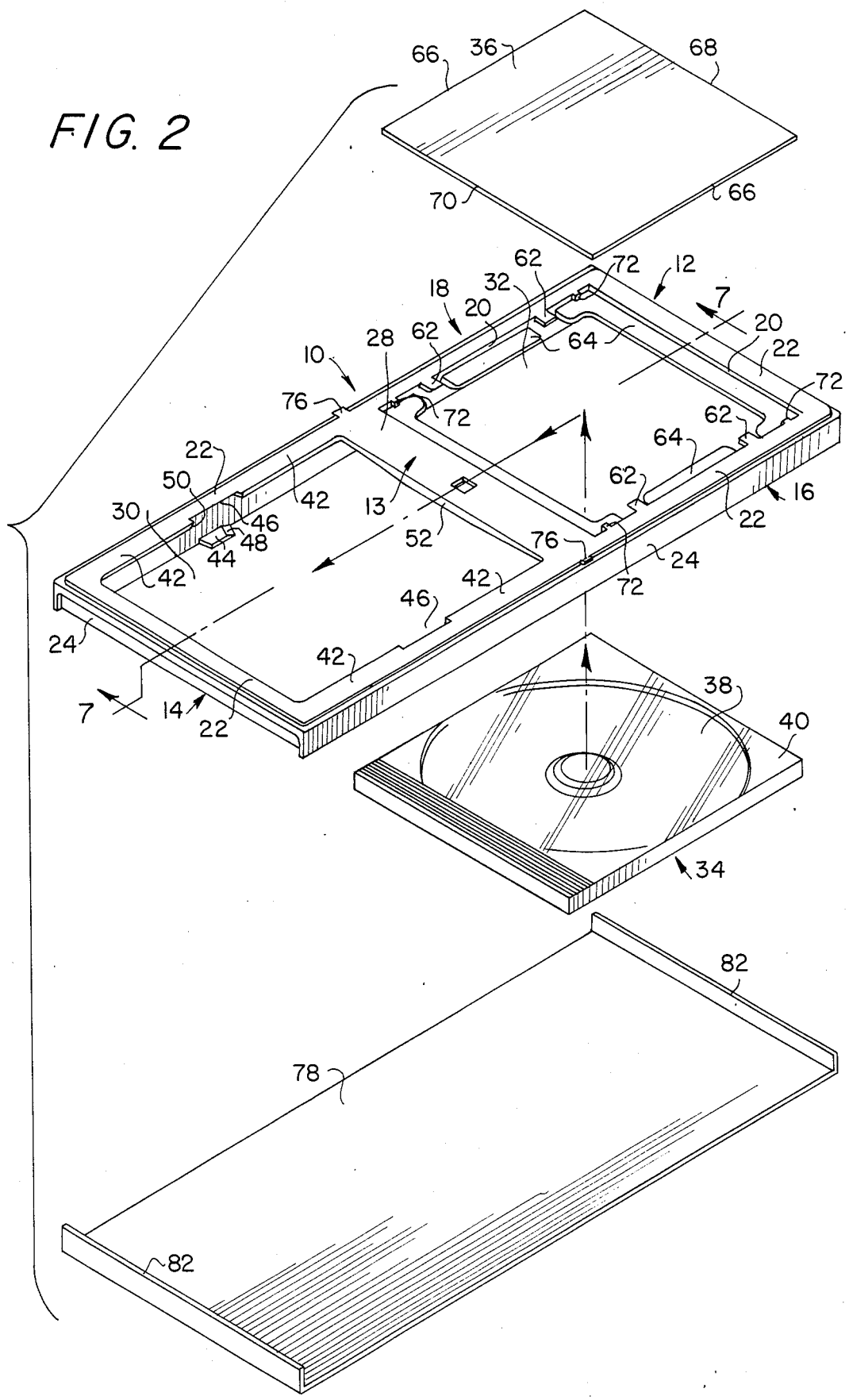

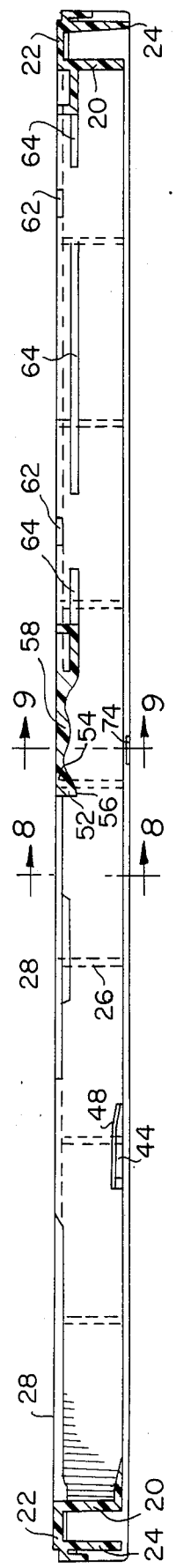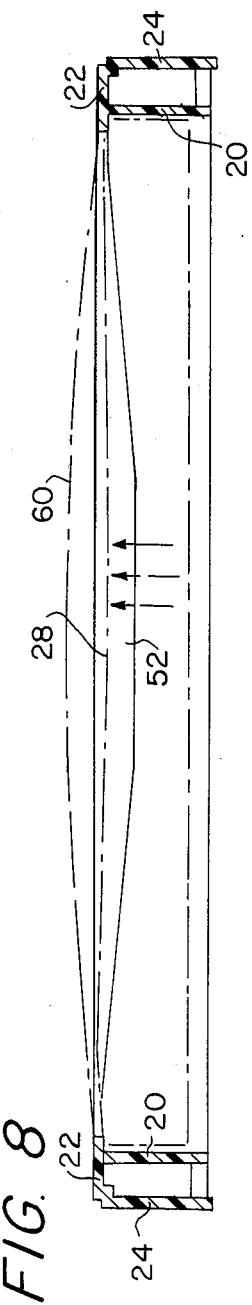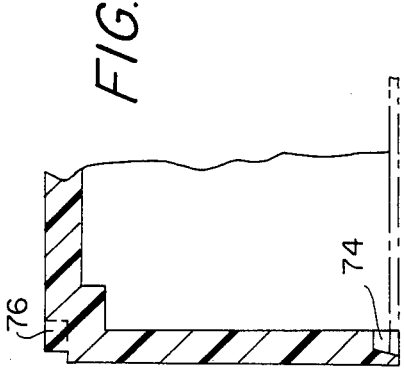
FIG. 7
FIG. 8
FIG. 9

THEFT-RESISTANT RETAIL CONTAINER

BACKGROUND OF THE INVENTION

1. Field of the Invention

The present invention is related to packaging for an item sold on the retail market, and more particularly, to a one-piece container for removably securing a compact disc or compact cassette.

2. Description of the Related Art

At the present time it is common to market small items in self-service retail outlets by affixing the item to a larger, relatively rigid package which is not easily shoplifted. In particular, audio tape cassettes and compact discs are typically packaged in this manner. The recording medium, whether it be tape or disc, is usually enclosed in a hinged storage box having dimensions very similar to the recording medium and in which the recording medium is stored after purchase. This storage box, with the recording medium inside, is affixed to a larger package prior to sale and removed therefrom after purchase by the consumer.

There are several desirable aspects of the larger package, hereinafter termed a retail container. First, it should be relatively difficult to remove the storage box containing the recording medium from the retail container in a retail outlet without being observed. On the other hand, it should be relatively easy for the consumer to remove the storage box and the recording medium after purchase. In addition, it is desirable that the retail container be capable of displaying information or advertisement about the recordings on the recording medium to attract and inform purchasers. It is further desirable that the retail container provide some additional protection for the recording medium and provide all of the above features without adding excessively to the cost of the item, including the actual container and the manufacturing and assembly thereof.

There are two types of commonly used retail containers for compact discs, both of which are approximately six inches by twelve inches and less than an inch thick.

The first type of retail container is known as a "tuck box" and is made of a paperboard material with graphics printed directly thereon. The commonly used storage box for compact discs is known as a "jewel box". It is conventional to include a "booklet" with each compact disc. The booklet conventionally contains the album cover graphics and liner notes and may include listings of other recordings available from the same distributor. The jewel box and booklet are inserted into the tuck box which is then sealed. The tuck box is relatively expensive due to the custom graphics and is easily opened in a retail outlet. Due to its opaque construction, pilferage of a recording from a tuck box is difficult to discover. In addition, tuck boxes do not lend themselves easily to automated insertion and sealing of the jewel box and booklet.

The second commonly used retail container for compact discs is a blister pack which contains the jewel box and the booklet in separate blisters formed of a relatively sturdy transparent plastic. Such blister packs are relatively difficult to open by the consumer after purchase and do not provide a spline surface which can display graphical information or advertisement from the top edge of the package for easy viewing by a purchaser browsing through a retailer's display bin or the like.

SUMMARY OF THE INVENTION

An object of the present invention is to provide a retail container for an item which is easily and inexpensively manufactured and lends itself to automation of packaging the item.

Another object of the present invention is to provide a retail container for an item which is easily opened by a consumer after purchase but difficult to open unobtrusively in a retail store prior to purchase.

Yet another object of the present invention is to provide a retail container for an item which displays the item in such a manner that pilferage is easily discovered.

A further object of the present invention is to provide a retail container for an item which provides maximum space for displaying information or advertisement.

The above objects are attained by providing a retail container for removably securing a substantially rigid item, comprising a vertically elongated frame forming sides, top and bottom of the retail container and forming side and bottom walls of a securing well; a front plate, integrally formed with the frame, having front and rear surfaces and a first aperture opening onto the securing well and forming securing well ledges for restraining the substantially rigid item from passing through the front plate from the securing well; securing well tabs, integrally formed with the frame at the side and bottom walls of the securing well, for restraining the substantially rigid item from moving in a rearward direction; and a center rib, integrally formed on the rear surface of the front plate of the top of the securing well, the frame, front plate and center rib being formed of a semirigid material flexing in response to external pressure to permit the substantially rigid item to be inserted into and removed from the securing well and substantially returning to an original position to secure the item when the external force is released.

Preferably, the center rib is tapered towards the side walls of the securing well and ends before reaching the side walls, thereby forming spaces between the center rib and the side walls of the securing well. In addition, the center rib preferably has a rearward directed rounded surface.

In the preferred embodiment, the retail container is formed of a one-piece injection molded material and removably secures a first item comprising a recording medium, a second item which is substantially planar and flexible and a back card for covering a rear side of the retail container without providing structural support, all of which is enclosed in shrink wrap prior to sale. The frame in the preferred embodiment forms sides, top and bottom of the retail container, side and bottom walls of a securing well and side and top walls of a display well. The frame is constructed of four integrally formed three-sided box beams arranged in a rectangular shape with inner, front and outer sides and integral transverse ribs attached and perpendicular to all three sides. The front plate is integrally formed with the frame and coplanar with the front sides of the box beams from which the frame is constructed. The front plate has front and rear surfaces and first and second apertures therein, the first aperture opening onto the securing well and the second aperture opening onto the display well. The front plate forms securing well ledges for restraining the first item from passing through the front plate from the securing well and display well tabs projecting into the second aperture.

In the preferred embodiment, securing well tabs are integrally formed with the frame at the rear of the side and bottom walls of the securing well for restraining the first item from passing through the rear side of the retail container and also includes display well ledges integrally formed on the top and side walls of the display well and attached to the rear surface of the front plate adjacent the bottom of the second aperture. Also included in the preferred embodiment is a center rib, integrally formed on the rear surface of the front plate at the top of the securing well, tapering towards the side walls of the securing well and ending before reaching the side walls, thereby forming spaced between the center rib and the side walls and having a rearward directed rounded surface. The frame, front surface and center rib are formed of a semirigid material which flexes in response to external pressure to permit the first item to be inserted into and removed from the securing well and substantially returns to an original position to secure the first item when the external force is released. The substantially planer flexible item is removably secured within the display well by the display well ledges and the display well tabs.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 2 is a perspective view of the front, bottom and sides of a retail container according to the present invention showing items which can be removably secured and attached to the retail container;

FIG. 7 is a cross-sectional side view of a retail container according to the present invention taken along line 7—7 in FIG. 2;

FIG. 8 is a cross-sectional view of a retail container according to the present invention taken along line 8—8 in FIG. 7;

FIG. 9 is a cross-sectional view of a portion of the frame of a retail container according to the present invention taken along line 9—9 in FIG. 7;

DESCRIPTION OF THE PREFERRED EMBODIMENT

Figure 1:
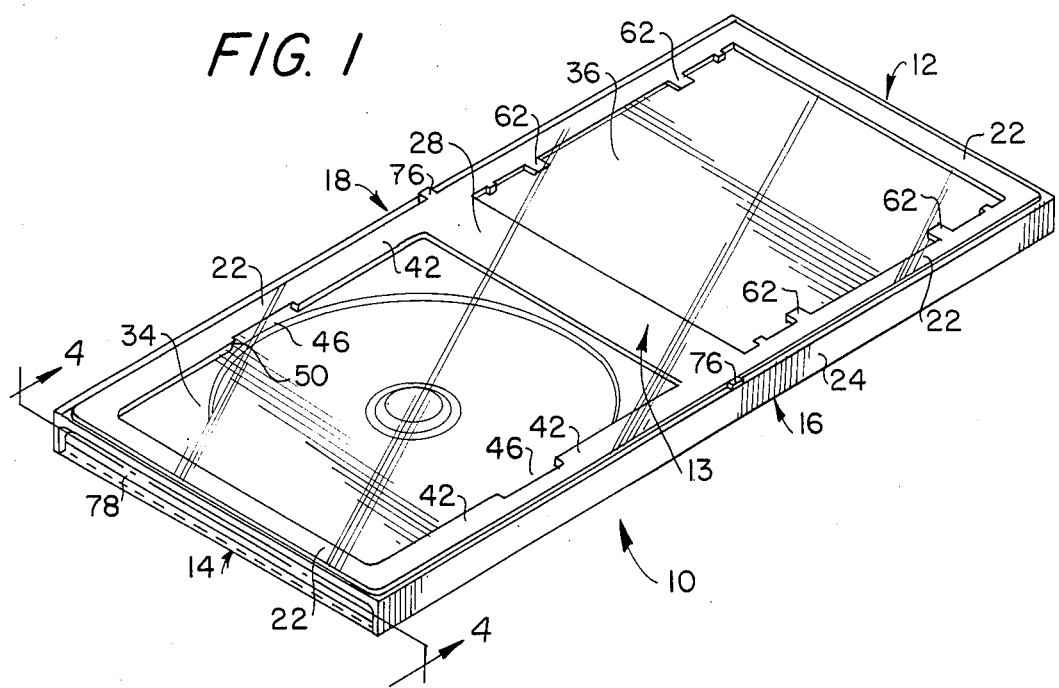
FIG. 1 is a perspective view of the front, bottom and side of a retail container according to the present invention which has been prepared for sale by surrounding it with shrink wrap.
Figure 4:
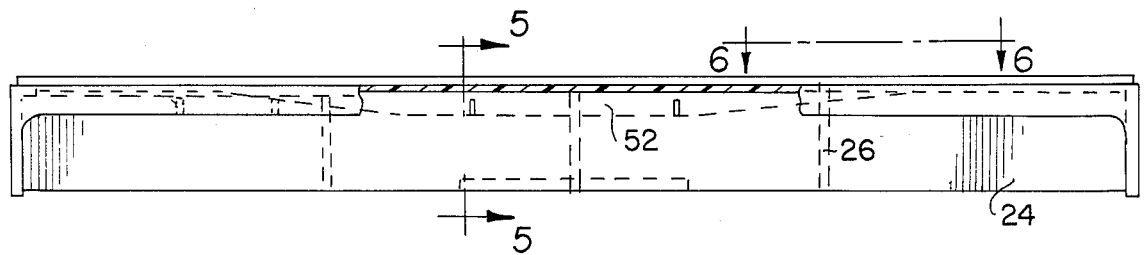
FIG. 4 is a bottom view of a retail container according to the present invention.
Figure 3:
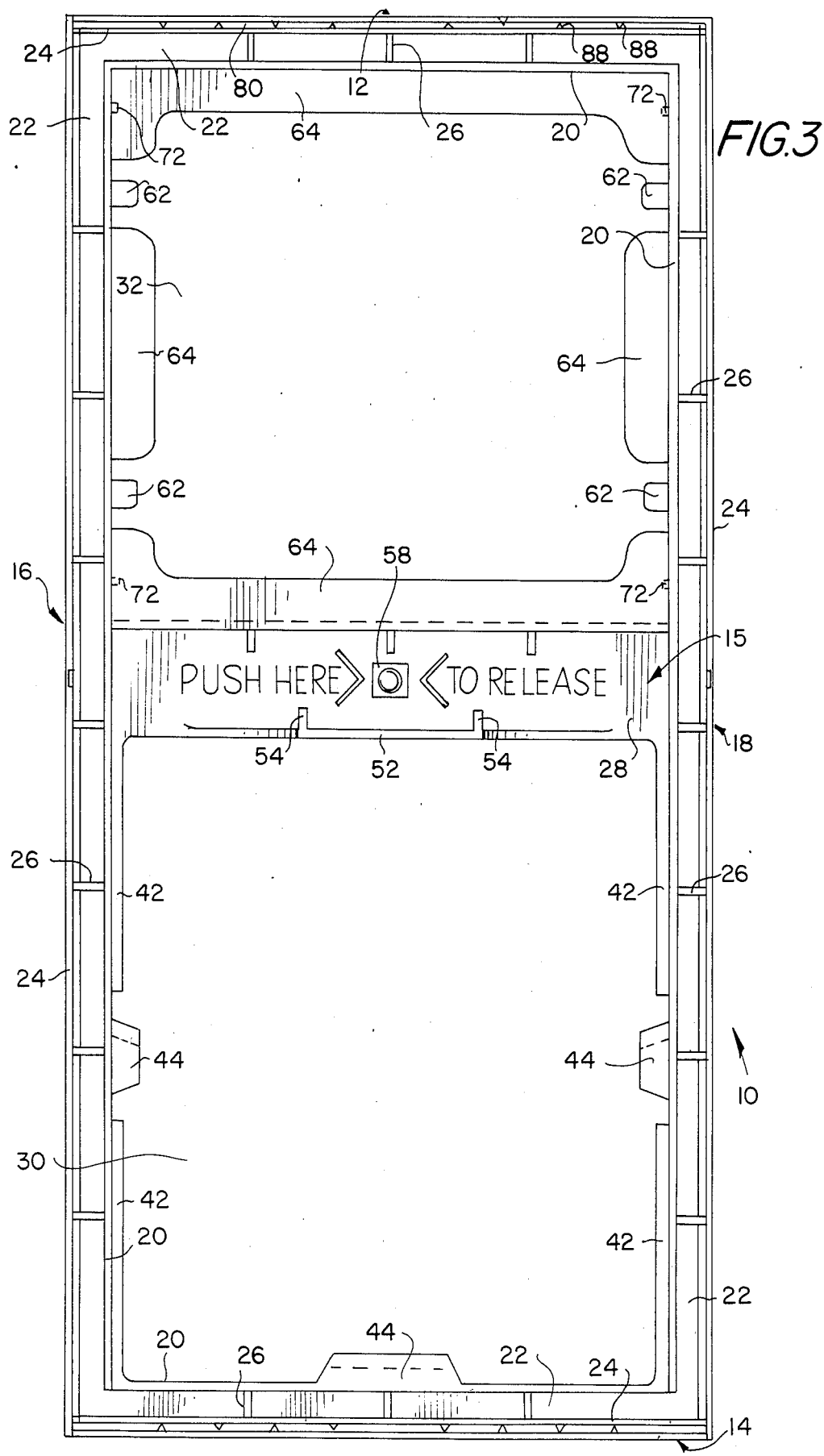
FIG. 3 is a rear plan view of a retail container according to the present invention.

As illustrated in FIGS. 1 and 2, a retail container 10 according to the present invention is preferably rectangular in shape, having a top 12, front 13, bottom 14, and sides 16 and 18. The front 13 of the retail container 10 is primarily visible in both FIGS. 1 and 2, but the rear of the retail container 10 can not be seen in the perspective views of FIGS. 1 and 2. A rear plan view is provided in FIG. 3 showing the rear 15 of the retail container.

The top 12, bottom 14, and sides 16 and 18 of the retail container 10 are formed by a frame, preferably a one-piece injection molded frame, constructed from three-sided box beams having inner sides 20, front sides 22 and outer sides 24. The outer sides 24 form the outer surface of the sides 16 and 18 and a portion of the outer surface of the top 12 and bottom 18. Integrally transverse ribs 26 are attached and perpendicular to all three sides of the box beam, as illustrated in FIG. 3. The transverse ribs provide increased structural rigidity to the frame.

As best illustrated in FIGS. 1 and 2, the front 13 of the container is in the form of a front plate comprising a front plate center member 28 integrally formed and coplanar with the front sides 22 of the frame. The front plate center member 28 and the front sides 22 form first and second apertures 30 and 32 in the front 13 of the container through the frame. These apertures 30 and 32 provide visibility of first and second items 34 an 36, respectively. In the illustrated preferred embodiment of the retail container, the first item is a substantially rigid item comprising a recording medium, such as a compact disc 38, in a storage box, such a jewel box-type enclosure 40. The second item 36 is substantially planar flexible item such as a booklet made of light cardboard or thick paper. The first and second items 34 and 36 are removably secured in the retail container 10.

The first item 34 is secured by the retail container 10 in a securing well having side and bottom walls formed by the inner side 20 of the frame at the bottom half of the retail container 10. The portion of the front plate member 28 surrounding the first aperture 30 forms securing well ledges 42 adjacent the side walls of the securing well. Securing well tabs 44, as illustrated in FIGS. 2 and 3, are integrally formed with the frame at the side and bottom walls of the securing well at the rear of the retail container 10. As illustrated in FIG. 2, the first item 34 is inserted into the securing well by being placed within the top half of the retail container 10 from the rear 15 and being slid downward into the securing well. The securing well tabs 44 prevent the first item 34 from moving in a rearward direction out of the frame, while the securing well ledges 42 prevent the first item 34 from passing through the front 13 of the container from the securing well. Openings 46 are defined by the securing well ledges 42 to permit the first item 34 to pass partially through the front plate 28 when the first item 34 is inserted into and removed from the securing well.

The location of the securing well tabs 44 on the side and bottom walls of the securing well can readily be adjusted or shifted to accommodate different sizes and thicknesses of the first item 34 without further substantial modifications to the components of the retail container. The location of the openings 46 can also be readily shifted along the securing well ledges 42 for similar reasons.

Figure 5:
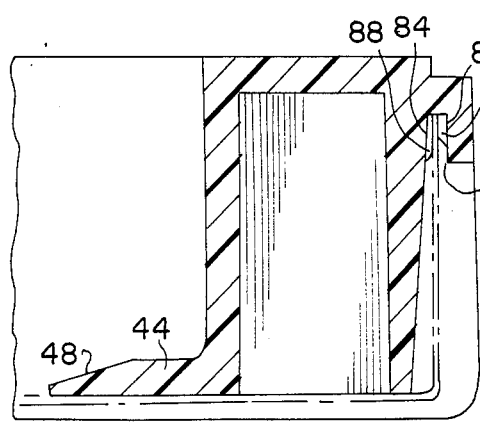
FIG. 5 is a cross-sectional view of a bottom portion of a retail container according to the present invention taken along line 5—5 in FIG. 4.

As illustrated in FIGS. 2, 3 and 5, the securing well tabs 44 have faces 48 which slant downward toward the rear of the frame and forward toward the top of the frame. Similarly, as illustrated in FIG. 1, there is a face 50 at the bottom of each opening 46 (only one of which is visible in FIG. 1) which slants downward toward the bottom and rear of the frame. The slanted faces 48 and 50 increase the ease with which the substantially rigid first item 34 can be slide into the securing well.

Figure 11:
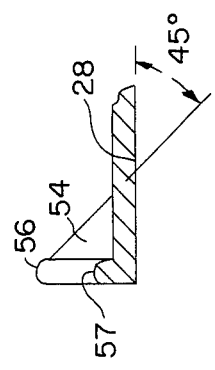
FIG. 11 is a cross-sectional view of the center rib of a retail container according to the present invention taken along 11—11 in FIG. 10.
Figure 10:
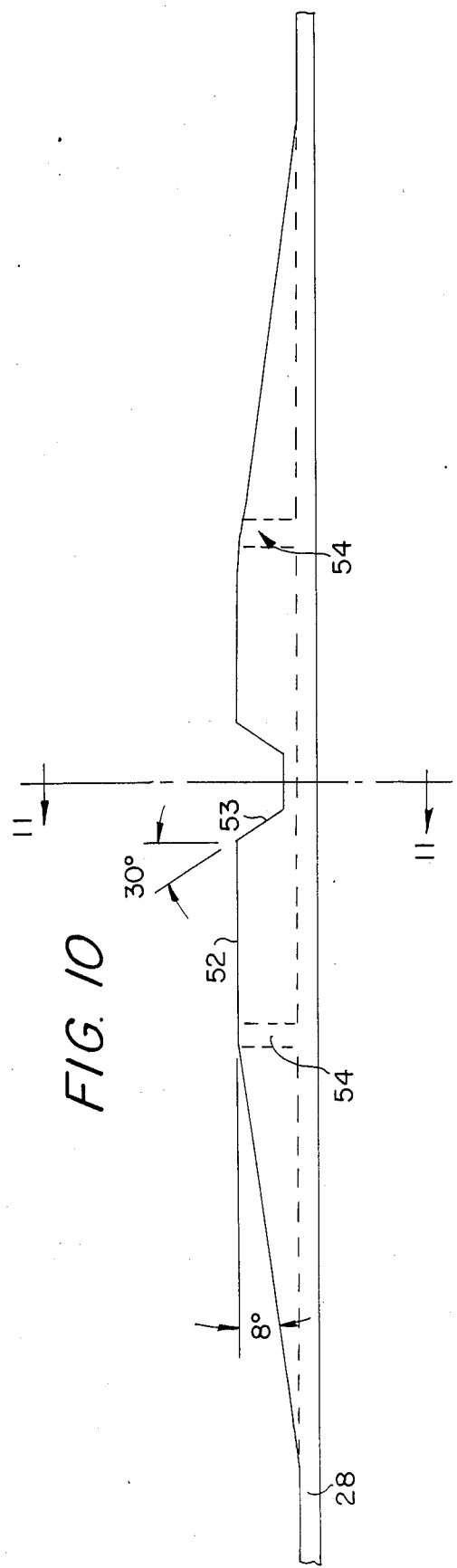
FIG. 10 is an enlarged view of the center rib of a retail container according to the present invention.

As illustrated in FIGS. 2-4, 7 and 8, a center rib 52 is integrally formed on the rear surface of the front plate member 28. As best illustrated in FIGS. 8 and 10, the center rib 52 tapers toward the inner sides 20 of the frame and ends before reaching the inner sides 20, thereby forming spaces between the center rib 52 and the inner sides 20 which form the side walls of the securing well. As further illustrated in FIGS. 3, 8 and 11, support ribs 54 are integrally formed with and abutting the center rib 52 and the rear side of the front plate member 28 and are perpendicular to both. As illustrated in FIGS. 7 and 11, the support ribs 54 have a triangular shape of an approximately 45° angle, thus both providing support for the center rib 52 and easing the entry of the substantially rigid first item 34 into the securing well. As also illustrated in FIGS. 7 and 11, the center rib 52 has a rearward directed rounded surface 56. In the cross-section of FIG. 7, taken along line 7—7 of FIG. 2 and thus parallel to the sides 16 and 18, the rounded surface 56 forms an arc.

To assist in automated insertion of the first item 34 into the retail container as will be further described hereafter, and as illustrated for the center rib 52 shown in FIG. 10, a notch 53 is formed through the thickness of the center rib 52 approximately centrally along the length of the rib. The walls of the notch 53 have rounded surfaces 57 similar to surfaces 56 of the rib 52 and for similar reasons. This is best seen in FIG. 11.

The substantially rigid item 34 can be inserted into and removed from the retail container 10 by pressing a boss 58, as instructed on the rear surface of the front plate member 28 and as illustrated in FIG. 3. The retail container 10 is preferably constructed of a semirigid material which flexes in response to exertion of external force on the boss 58 by movement in a forward frontal direction to an extent indicated by the upper chain-dotted line 60 in FIG. 8. For insertion of item 34, this permits the substantially rigid item 34 to pass over the rounded surface 56 of the center rib 52 and between the securing well ledges 42 and securing well tabs 44 until the item 34 reaches the inner side 20 of the bottom 14 of the retail container 10. The securing well is constructed with dimensions slightly larger than those of the jewel box-type enclosure 40 so that the center rib 52 can substantially return to an original position indicated by the solid line of the front plate member 28 in FIG. 8. As a result, the substantially rigid item 34 is fairly well secured within the securing well of the retail container 10 until external force is exerted on the boss 58 by the purchaser for removal of the item 34 in a reverse manner to the insertion process. The openings 46 in the securing well ledges 42 permit the substantially rigid item 34 to be more easily inserted and removed at a slight angle, thereby simplifying the insertion and removal process.

As previously described, notch 53 can be provided in center rib 52. By doing so, an automated insertion of the substantially rigid item 34 into the retail container 10 can more readily be accommodated in instead of pressing boss 58. By example, the retailer container 10 can be positioned with the rear thereof facing upwardly, as shown in FIG. 3, so that the item 34 is placed over the rear of the container by automated means and then moved downward toward the rear of the container. A mechanical gripper or finger mechanism from underneath the container can be moved upwardly from the front thereof through the aperture 30 into the notch 53 and then flex the center rib 52 downwardly by reverse downward force of the mechanical gripper mechanism. At this time the item 34 can be mechanically inserted from above on the rear of the container into the securing well. After insertion of item 34 into the securing well, the mechanical gripper mechanism is released from the notch 53 and the center rib 52 flexes back to its original position to secure the item 34 in the securing well.

The second aperture 32 opens onto a display well formed by the inner sides 20 of the frame at the top half of the retail container 10. The front sides 22 include display well tabs 62 which project into the second aperture 32 as illustrated in FIGS. 1-3. As illustrated in FIGS. 2, 3 and 7, display well ledges 64 are integrally formed with and project from the inner sides 20 into the second aperture 32 of the retail container 10 surrounding the display well. One of the display well ledges 64 is attached to the rear surface of the front plate member 28 adjacent the bottom of the second aperture 32. The substantially planar flexible item 36 is inserted into the display well by exerting pressure along sides 66 (FIG. 2) so that the top 68 and bottom 70 of the second item 36 bend to permit the second item 36 to be inserted between the display well tabs 62 on sides 16 and 18 of the retail container 10. When the sides 66 of the second item 36 are resting on the display well ledges 64, pressure on the item 36 can be released to permit it to substantially return to its original shape. The dimensions of the display well are slightly larger than the item 36 which is to be inserted therein so that the item 36 is removably secured between the display well tabs 62 and the display well ledges 64 as well as the inner surfaces 20 of the top 12 and sides 16 and 18 formed by the frame.

Preferably, as illustrated in FIGS. 2 and 3, spacers 72 are integrally formed on the inner sides 20 of the frame within the display well to ensure space between the substantially planar flexible item 36 and the inner sides 20. This is one of the features of a retail container 10 according to the present invention which simplifies automation of packaging using the retail container 10. A slender mechanical gripper can be used to bend the second item 36, insert it into the display well and then separate until the gripper touches inner sides 20. The spacers 72 help ensure that contact between the gripper and second item 36 is broken prior to removal of the gripper from the display well.

Another feature of the present invention which provides assistance in automated packaging using the retail container 10 are alignment notches 74 and alignment tabs 76, substantially aligned with box 58 and illustrated in FIGS. 1, 2, 7 and 9. These notches 74 and projections 76 aid in proper alignment of the retail container during molding, and transport to automation for assembly of the package containing the first and second items 34 and 36.

As noted above, in conventional marketing of compact discs the substantially planar flexible item 36 is a booklet describing the recording or recordings on the recording medium 38. This booklet typically contains a reduced image of the album cover used in marketing LP records containing the same recordings as the compact disc 38. Due to the small size of type which may appear on the booklet 36, preferably a back card 78 is used to provide an inexpensive medium for displaying information or advertisement regarding the contents of the recording medium 38. The back card 38 is preferably card stock which has been printed using inexpensive text printing means and shaped as illustrated in FIG. 2. The print would be on the outer surface of the back card from the rear of the detail container.

Figure 6:
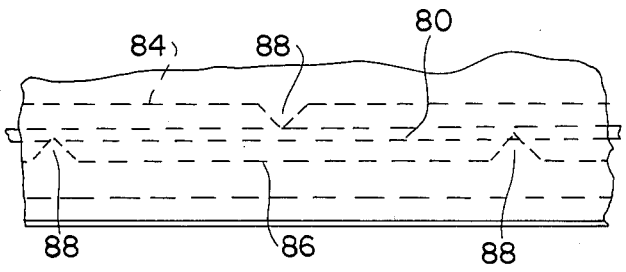
FIG. 6 is a partial front plan view of the bottom of a retail container according to the present invention.

To aid in the attachment of the back card 78 to the retail container 10, back card receiving slots 80 are integrally formed on the outer surfaces of the top 12 and bottom 14 of the retail container 10 to receive edges 82 of the back card 78, as illustrated in FIG. 1. The back card receiving slots 80 are illustrated in an enlarged cross-section in FIG. 5 and in dashed lines in an enlarged front plan view in FIG. 6. As illustrated in FIGS. 5 and 6, the back card receiving slots 80 have opposite walls 84 and 86 with nodules 88 integrally formed thereon projecting into the back card receiving slot 80, with alternating spacing along the walls 84 and 86. The alternating spacing of the nodules 88 help grip the edges 82 of the back card 78, by forcing the edges 82 into a slightly serpentine shape, to hold the back card 78 in place during package assembly while the retail container 10 containing the first and second items 34 and 36 is enclosed in shrink wrap. As best seen from FIG. 5, the majority of the edge portion 82 of the back card remains outside the slot 80. Thus, the outer or spline surface of the top and bottom edges 82 can also be used for displaying printed information.

As an alternative to a full back card 78 as shown in FIG. 2, there can be provided modifications to the back card. For example, a half card could be used. More significantly, only the top and bottom card edges 82 could be used to comprise the card by inserting these card edges 82 into the slots 80, with the package then shrink wrapped. The top and/or bottom edges 82 would continue to allow use of the outer or spline surfaces of edges 82 for visibly displaying printed information, such as a recording title, to a purchaser browsing through a series of recording packages in a retailer's display bin or the like. At the same time, substantial cost savings could be achieved by eliminating the full back card. As can readily be appreciated, these modifications to the back card are made possible because the back card is not required for securing the items 34 and 36 in the one-piece container 10.

While the preferred embodiment has been described for use in retailing compact discs, the retail container 10 can be used for different types of objects with minor modifications regarding dimensions. For example, other small recording mediums besides compact discs are also conventionally sold attached to larger objects, in part to reduce the possibility of shoplifting. Also, with minor modifications to size, one or more compact discs could be inserted into the securing well. By another example, a compact disc jewel box of a smaller thickness could readily be accommodated by relocating the well tabs 44 on the bottom and side walls of the securing well. In addition, computer diskettes could be sold in a similar type of container. The more rigid 3½ inch diskettes could be inserted into the securing well, while the more flexible 5¼ inch diskettes could be held in either the securing well or the display well. In the case of 5¼ inch diskettes, a small manual could be held in the securing well while the diskette itself is placed in the display well. In addition, a retail container having only a securing well or only a display well could be used for any type of item. Similarly, a retail container according to the present invention is not limited to use with recording mediums, but could be applied to any small object which can be held in the manner described above. Furthermore, the use of terms "top", "bottom", "front", "rear" and "sides" are not intended to limit the orientation of the items of the container.

As can be seen from the above description of the construction of a retail container according to the present invention, a package containing one or two items can easily be assembled and removably contained in a single, one-piece injection molded container using automated machinery. Moreover, the back card 78 provides an excellent display area for low cost information about the contents of recordings in the retail container 10. In combination with the open top and bottom configuration of the retail container 10, the outer surface of the top edge 82 of the back card 78 remains visibly exposed and can be printed with the title of the packaged recording for easy readability by a purchaser browsing through a series of packages in a retailer's display bin or the like. After shrink wrap has enclosed the retail container 10, items 34, 36 and back card 78, it is relatively difficult to unobtrusively remove a recording 38 from the retail container 10 prior to purchase, but relatively easily to remove the shrink wrap after purchase. The booklet 36 is easily removed from the display well and the jewel box-type enclosure 40 easily removed from the securing well. Thus, the present invention provides a retail container which is superior to those in the prior art.

The many features and advantages of the present invention are apparent from the detailed specification, and thus, it is intended by the appended claims to cover all such features and advantages which are within the spirit and scope of the invention. Further, since numerous modifications from the disclosure of the invention will readily occur to those skilled in the art, it is not desired to limit the invention to the exact construction and operation illustrated and described. Accordingly, suitable modifications and equivalents may be resorted to, all falling within the scope and spirit of the invention.

What is claimed is:

1. A retail container for removably securing a substantially rigid item, comprising:
   vertically elongated frame means for forming sides, top and bottom of said retail container and for forming a securing well with two side walls and a bottom wall;
   front plate means, integrally formed with said frame means at the front thereof, for forming front and rear surfaces and a first aperture opening onto the securing well and for forming securing well ledges for restraining the substantially rigid item from passing through said front plate from the securing well;
   securing well tab means, integrally formed with said frame means at the rear and along the side and bottom walls of the securing well, for restraining the substantially rigid item from moving in a rearward direction; and
   center rib means, integrally formed on and perpendicular to the rear surface of said front plate means at the top of the securing well, said center rib means having a rear edge tapering towards the side walls of the securing well and ending before reaching the side walls, thereby forming spaces between said center rib means and the side walls of the securing well, said frame means, said front plate means and said center rib means formed from a semirigid material for flexing in response to external pressure on the rear edge of said center rib means to permit the substantially rigid item to be inserted into and removed from the securing well and substantially returning to an original position to secure the substantially rigid item when the external force is released.

2. A retail container for removably securing a substantially rigid item, comprising:
a verticallyelongated frame forming sides, top and bottom of said retail container and forming a securing well with two side walls and a bottom wall;
a front plate, integrally formed with said frame at the front thereof having front and rear surfaces and a first aperture opening into the securing well and forming securing well ledges for restraining the substantially rigid item from assing through said first plate from the securing well;
securing well tabs, integrally formed with said frame at the rear and along the side and bottom walls of the securing well, for restraining the substantially rigid item from moving in a rearward direction; and
a center rib, integrally formed on and perpendicular to the rear surface of said front plate at the top of the securing well, said center rib having a rear edge tapering towards the side walls of the securing well and ending before reaching the side walls, thereby forming spaced between said center rib and the side walls of the securing well, said frame, said front plate and said center rib formed of a semirigid material flexing in response to external pressure on the rear edge of said center rib, thereby permitting the substantially rigid item to be inserted into and removed from the securing well and substantially returning to an original position to secure the substantially rigid item when the external force is released.

3. A retail container as recited in claim 2, wherein said center rib has a rearward rounded surface.

4. A retail container as recited in claim 3, further comprising support ribs having a triangular shape, integrally formed with and abutting said center rib and the rear side of said front plate, and extending perpendicular to said center rib on the top side thereof.

5. A retail container as recited in claim 3, wherein the substantially rigid item, said frame, the securing well and the first aperture are substantially rectangular.

6. A retail container as recited in claim 5,
wherein said frame comprises four integrally formed three-sided box beams with integral transverse ribs attached and perpendicular to all three sides, and
wherein said center rib has a cross section taken along a plane parallel to the sides formed by said frame, the rounded surface of said center rib substantially forming an arc in the cross section of said center rib.

7. A retail container as recited in claim 6, wherein said retail container further removably secures a substantially planar flexible item,
wherein the top, bototm and sides formed by said frame have inner and outer surfaces perpendicular to said front plate,
wherein said front plate has a front plate center member, integrally formed and connected between the sides of the frame,
wherein said front plate has a second aperture between the top of said retail container and the front plate center member, said front plate further forming display well tabs projecting into the second aperture, and
wherein said retail container further comprises display well ledges integrally formed on the inner surfaces of the top and sides of said retail container and attached to said front plate adjacent the bottom of the second aperture, the display well ledges removably securing the substantially planar flexible item between said display well tabs, said display well ledges and the inner surfaces of the top and sides formed by said frame.

8. A retail container as recited in claim 7, further comprising back card receiving slots, integrally formed on the outer surfaces of the top and bottom formed by said frame, for receiving edges of a back card substantially covering the rear of said retain container, said back card receiving slots having opposing walls with nodules integrally formed thereon projecting into said back card receiving slots with alternating spacing along the opposing walls.

9. A retail container as recited in claim 6,
wherein said top and bottom of the frame have outer surfaces, and
wherein said retail container further comprises back card receiving slots, integrally formed on the outer surfaces of the top and bottom formed by said frame, for receiving edges of a back card substantially covering the rear of said retail container, said back card receiving slots having opposing walls with nodules integrally formed thereon projecting into said back card receiving slots with alternating spacing along the upper and lower walls.

10. A retail container as recited in claim 3, wherein said retail container further movably secures a substantially planar flexible item,
wherein the top, bottom and sides formed by said frame have inner and outer surfaces perpendicular to said front plate,
wherein said front plate has a front plate center member, integrally formed and connected between the sides of the frame,
wherein said front plate has a second aperture between the top of said retail container and the front plate center member, said front plate further forming display well tabs projecting into the second aperture, and
wherein said retail container further comprises display well ledges integrally formed on the inner surfaces of the top and sides of said frame and attached to said front plate adjacent the bottom of the second aperture, the display well ledges removably securing the substantially planar flexible item between said display well tabs, said display well ledges and the inner surfaces of the top and sides formed by said frame.

11. A retail container as recited in claim 10, further comprising back card receiving slots, integrally formed on the outer surfaces of the top and bottom formed by said frame, for receiving edges of a back card substantially covering the rear of said retail container, said back card receiving slots having upper and lower walls with nodules integrally formed thereon projecting into said back card receiving slots with alternating spacing along the upper and lower walls.

12. A retail container as recited in claim 3, wherein said top and bottom have outer surfaces, and wherein said retail container further comprises back card receiving slots, integrally formed on the outer surface of the top and bottom formed by said frame, for receiving edges of a back card substantially covering the rear of said retail container, said back card receiving slots having opposing walls with nodules integrally formed thereon projecting into said back card receiving slots with alternating spacing along the opposing walls.

13. A retail container as recited in claim 2 wherein said securing well tabs have top edges defining faces slanted downward toward the rear of the frame and forward toward the top of the frame.

14. A retail container as recited in claim 2, wherein the container is formed of a single-piece of injection molded material.

15. A retail container as recited in claim 2, wherein shrink wrap is provided around said container, after inspection of the substantially rigid item, said substantially planar flexible item, and said back card in said frame.

16. A retail container as recited in claim 15, wherein the container is formed of a single-piece of injection molded material.

17. A retail container for removably securing a substantially rigid item and a substantially planar flexible item, comprising:
- a vertically elongated frame forming top, bottom and sides of said retail container and forming side walls and a bottom wall of a securing well, said frame having inner and outer surfaces;
- a front plate, integrally formed with said frame, including a front plate center member integrallyformed and connected between the sides of said frame, said front plate having front and rear surfaces and a first aperture opening onto the securing well and forming securing well ledges for restraining the substantially rigid item from passing through said front plate from the securing well and a second aperture between the top of said retail container and the front plate center member, said front plate further forming display well tabs projecting into the second aperture;
- securing well tabs, integrally formed with said frame at the rear and along the side and bottom walls of the securing well, for restraining the substantially rigid item from moving in a rearward direction; and
- a center rib, integrally formed on and perpendicular to the rear surface of said front plate at the top of the securing well, said frame, said front plate and said center rib formed of a semirigid material flexing in response to external pressure on the rear edge of said center rib, thereby permitting the substantially rigid item to be inserted into and removed from the securing well and substantially returning to an original position to secure the substantially rigid item when the external force is released; and
- display well ledges integrally formed on the inner surfaces of the top and sides of said frame and attached to the rear surface of said front plate adjacent the bottom of the second aperture, the substantially planar flexible item being removably secured by said display well tabs, said display well ledges and the inner surfaces of the top and sides formed by said frame.

18. A retail container as recited in claim 17, further comprising back card receiving slots, integrally formed on the outer surface of the top and bottom formed by said frame, for receiving edges of a back card substantially covering the rear of said retail container, said back card receiving slots having opposing walls with nodules integrally formed thereon projecting into said back card receiving slots with alternating spacing along the opposing walls.

19. A retail container for removably securing a substantially rigid item, comprising:
- a vertically elongated frame forming sides, top and bottom of said retail container and forming a securing well with two side walls and a bottom wall, the top and bottom of said retail container having outer surfaces;
- a front plate integrally formed with said frame, having front and rear surfaces and a first aperture opening onto the securing well and forming securing well ledges for restraining the substantially rigid item from passing through said front plate from the securing well;
- securing well tabs, integrally formed with said frame at the rear and along the side and bottom walls of the securing well, for restraining the substantially rigid item from moving in a rearward direction;
- a center rib, integrally formed on and perpendicular to the rear surface of said front plate at the top of the securing well, said frame, said front plate and said center rib formed of a semirigid material flexing in response to external pressure on the rear edge of said center rib, thereby permitting the substantially rigid item to be inserted into and removed from the securing well and substantially returning to an original position to secure the substantially rigid item when the external force is released; and
- back card receiving slots, integrally formed on the outer surfaces of the top and bottom formed by said frame, for receiving edges of a back card substantially covering the rear of said retail container, said back card receiving slots having opposing walls with nodules integrally formed thereon projecting into said back card receiving slots with alternating spacing along the opposing walls.

20. A retail container for removably securing a substantially rigid item, comprising:
- a vertically elongated frame forming sides, top and bottom of said retail container and forming a securing well with two side walls and a bottom wall;
- a front plate, integrally formed with said frame, having front and rear surfaces and a first aperture opening onto the securing well and forming securing well ledges for restraining the substantially rigid item from passing through said front plate from the securing well, said securing well ledges formed by said front plate having openings therein combining with the first aperture to provide space for the substantially rigid item to pass partially through said front plate during insertion and removal of the substantially rigid item, the openings in said securing well ledges being defined at the bottom thereof by faces slanted downward toward the bottom and rear of the frame;
- securing well tabs, integrally formed with said frame at the rear and along the side and bottom walls of the securing well, for restoring the substantially rigid item from moving in a rearward direction; and a center rib, integrally formed on and perpendicular to the rear surface of said front plate at the top of the securing well, said frame, said front plate and said center rib formed of a semirigid material flexing in response to external pressure on the rear edge of said center rib, thereby permitting the substantially rigid item to be inserted into and removed from the securing well and substantially returning to an original position to secure the substantially rigid item when the external force is released.

21. A one-piece injection molded retail container for removably securing a first item comprising a recording medium, a second item substantially planar and flexible and a back card for covering a rear side of the retail container without providing structural support, all of which is enclosed in shrink wrap prior to sale, said retail container comprising:

a vertically elongated frame, forming sides, top and bottom of said retail container and forming side and bottom walls of a securing well and side and top walls of a display well, said frame including four integrally formed three-sided box beams arranged in a rectangular shape with inner, front and outer sides and integral transverse ribs attached and perpendicular to all three sides;

a front plate having a front plate center member integrally formed with said frame and coplanar with the front sides thereof, having front and rear surfaces and first and second apertures, the first aperture opening onto the securing well and the second aperture opening onto the display well, said front plate forming securing well ledges for restraining the first item from passing through said front plate from the securing well and display well tabs projecting into the second aperture;

securing well tabs, integrally formed with said frame at the rear of the side and bottom walls of the securing well for restraining the first item from passing through the rear side of said retail container;

display well ledges integrally formed on the top and side walls of the display well and attached to the rear surface of said front plate adjacent the bottom of said second aperture, the substantially planar flexible item being removably secured by said display well ledges and said display well tabs; and a center rib, integrally formed on the rear surface of said front plate at the top of the securing well, tapering towards the side walls of the securing well and ending before reaching the side walls, thereby forming spaced between said center rib and the side walls of the securing well and having a rearward directed rounded surface, said frame, said front plate and said center rib formed of a semirigid material, flexing in response to external pressure to permit the first item to be inserted into and removed from the securing well and substantially returning to an original position to secure the first item when the external force is released.

22. A retail container as recited in claim 21, wherein the recording medium is a compact disc, the first item further comprises a jewel box-type enclosure for the compact disc and the second item is a booklet describing a recording on the compact disc, wherein the securing well has dimensions slightly larger than the jewel box-type enclosure, wherein the second aperture is rectangular in shape and has dimensions slightly larger than the booklet, and wherein said retail container further comprises spacers, integrally formed on the inner sides of said frame within the display well, for providing a space between the booklet and the side walls of the display well.

23. A retail container as recited in claim 22, wherein said securing well ledges formed by said front plate have openings therein combining with the first aperture to provide space for the substantially rigid item to pass partially through said front plate during insertion and removabl of the substantially rigid item, the openings in said securing well ledges being defined at the bottom thereof by faces slanted downward toward the bottom and rear of the frame, and wherein said securing well tabs have top edges formed by faces slanted downward toward the rear of the frame and forward toward the top of the frame.

* * * * *

UNITED STATES PATENT AND TRADEMARK OFFICE
CERTIFICATE OF CORRECTION

PATENT NO.   : 4,760,914

DATED        : August 2, 1988

INVENTOR(S) : Anthony Gelardi, et al.

It is certified that error appears in the above-identified patent and that said Letters Patent is hereby corrected as shown below:

Column 4,   line 13, "18" should be --14--;

line 25, "an" should be --and--.

Column 9,   line 11, "verticallyelongated" should be --vertically elongated--;

line 18, "assing" should be --passing--.

Column 11,  line 35, "lyformed" should be --ly formed--.

Column 14,  line 37, "removabl" should be --removed--.

Signed and Sealed this

Thirteenth Day of December, 1988

*Attest:*

DONALD J. QUIGG

*Attesting Officer*        *Commissioner of Patents and Trademarks*